United States Patent [19]
White et al.

[11] Patent Number: 5,886,868
[45] Date of Patent: Mar. 23, 1999

[54] ELECTRICAL DISTRIBUTION PANEL ENCLOSURE

[75] Inventors: Percy A. White, Beaver, Pa.; Donald F. Gehrs, Springfield, Ill.

[73] Assignee: Eaton Corporation, Cleveland, Ohio

[21] Appl. No.: 720,901

[22] Filed: Oct. 10, 1996

[51] Int. Cl.[6] .................................................. H02B 1/20
[52] U.S. Cl. ........................................... 361/652; 361/673
[58] Field of Search .............................. 174/38; 361/600, 361/610, 622, 625, 627–628, 631, 634–647, 652–658, 673

[56] References Cited

U.S. PATENT DOCUMENTS

| | | | |
|---|---|---|---|
| 2,603,546 | 7/1952 | Lais | 361/643 |
| 3,202,881 | 8/1965 | Carlyle | 361/644 |
| 3,864,511 | 2/1975 | Morby et al. | 361/643 |
| 4,698,727 | 10/1987 | Hibbert et al. | 361/643 |
| 4,716,496 | 12/1987 | Fritsch | 361/627 |
| 4,783,718 | 11/1988 | Raabe et al. | 361/634 |

*Primary Examiner*—Gregory Thompson
*Attorney, Agent, or Firm*—Martin J. Moran

[57] ABSTRACT

An enclosure for an electrical distribution panel includes a box having a front opening covered by a front panel having a cut-out portion. An insert is seated in the cut-out portion and includes removable knockout panels for access to circuit breakers mounted in the enclosure. The insert may be provided with a cover which enhances the appearance of the enclosure and provides a waterproof seal. The size of the insert is selected based on the type of circuit breaker to be mounted in the enclosure. By changing the size of the insert, the enclosure can be used with different types of circuit breakers. The enclosure can also be adapted for indoor or outdoor use. The enclosure avoids the disadvantages of conventional enclosures which are designed differently for different types of circuit breakers, and include entirely different components for indoor and outdoor use.

25 Claims, 9 Drawing Sheets

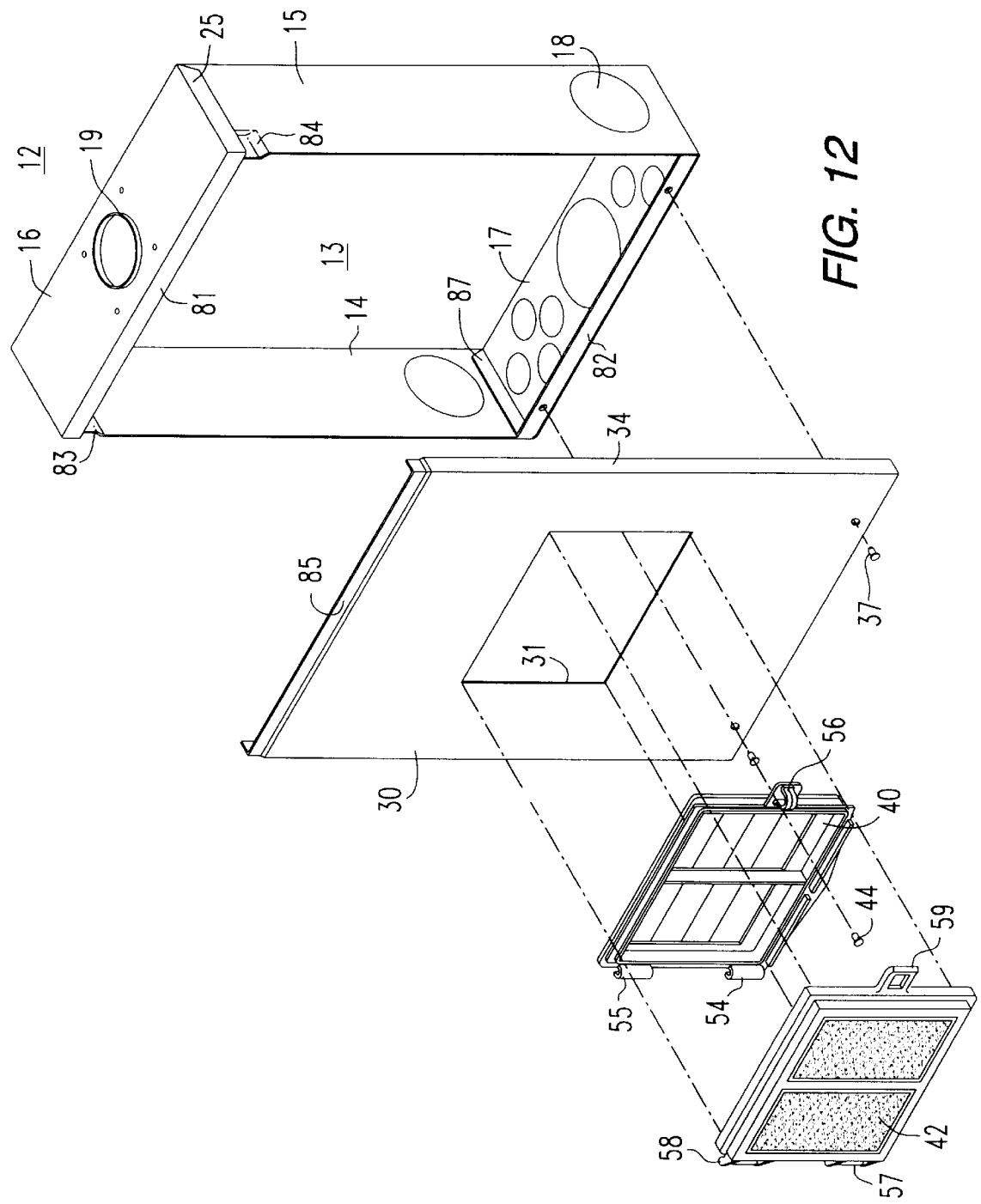

ELECTRICAL DISTRIBUTION PANEL ENCLOSURE

BACKGROUND OF THE INVENTION

1. Field of the Invention

The present invention relates to electrical distribution panels, and more particularly relates to an improved enclosure for such panels which is adaptable to indoor or outdoor use and which can be used with different types of circuit breakers.

2. Background Information

Electrical distribution panels or load centers are used widely in residential and commercial applications. The distribution panels house electrical circuit breakers within an enclosure. In conventional designs, different types of enclosures are provided for indoor and outdoor use. Outdoor enclosures are waterproof in order to conform with NEMA 3R standards, while indoor enclosures are not waterproof and conform with NEMA 1 standards.

In order to provide a waterproof or rain proof seal, conventional outdoor distribution panel enclosures typically comprise a box made of folded sheet metal having a separate top piece which covers the folded seams. An internal panel covers the front of the box and includes openings for access to the electrical circuit breakers. A separate front cover which is hinged underneath the top cover of the enclosure can be rotated into a closed position covering the entire front surface of the box. While such conventional waterproof designs meet NEMA 3R standards, they comprise a relatively large number of components and are relatively costly to fabricate.

Prior art indoor distribution panel enclosures typically comprise a box made of folded sheet metal and a separate cover fastened to the front of the box having openings for access to the circuit breakers. In addition, many indoor distribution panel enclosures comprise a front door which can be opened and closed for access to the circuit breakers. The folded metal boxes of such enclosures typically have corner seams which allow water to enter. In addition, the front covers are attached to the boxes in such a manner that allows water penetration.

Most residential and light commercial circuit breakers in current use have two different configurations. One type of circuit breaker has a 1 inch wide breaker pole and includes heels which are inserted underneath a support clip attached to the rear panel of the enclosure. Another type of circuit breaker has a ¾ inch wide breaker pole and includes hooks which are fastened over a support bracket attached to the rear of the enclosure. Due to the different types of circuit breakers conventionally used, prior art distribution panel enclosures have been designed differently depending on the particular type of circuit breaker to be mounted therein. Thus, in addition to different designs for indoor and outdoor use, conventional distribution panel enclosures have been designed differently depending on the type of circuit breaker to be used.

The present invention has been developed in view of the foregoing and other deficiencies of the prior art.

SUMMARY OF THE INVENTION

The present invention provides an electrical distribution panel having a minimal number of component parts which is adaptable for indoor or outdoor use. The enclosure is also suitable for use with different types of circuit breakers. The enclosure includes a front panel having a cut-out portion which receives an insert. The insert can be provided with a cover which provides a substantially waterproof seal for outdoor use. In addition, the dimensions of the insert can be varied depending on the particular type of circuit breaker to be mounted in the enclosure.

An object of the present invention is to provide an enclosure for an electrical distribution panel including a box having a rear panel with side, top and bottom walls extending therefrom forming a front opening. A front panel covers the front opening and includes a cut-out portion which receives an insert. The insert extends through the cut-out portion of the front panel toward the rear panel of the box and includes knockout panels which may be removed in order to allow access to a circuit breaker in the enclosure.

Another object of the present invention is to provide an insert for an electrical distribution panel including a rim for seating the insert adjacent a front panel of the enclosure, an extended portion which can be inserted through a cut-out portion of the front panel, and knockout panels which can be removed in order to allow access to a circuit breaker switch mounted in the enclosure.

A further object of the present invention is to provide an electrical distribution panel having circuit breakers which are accessible through openings in an insert mounted through the front panel of an enclosure.

Another object of the present invention is to provide a method of making an enclosure for an electrical distribution panel including the steps of forming a box having rear, side, top and bottom walls, providing a front panel having a cut-out portion, mounting an insert in the cut-out portion of the front panel and fastening the front panel over the front opening of the box.

These and other objects of the present invention will be more readily apparent from the following description.

BRIEF DESCRIPTION OF THE DRAWINGS

FIG. 12 is an exploded perspective view showing the component parts of an electrical distribution panel enclosure in accordance with another embodiment of the present invention.

DETAILED DESCRIPTION OF THE PREFERRED EMBODIMENTS

Figure 1:
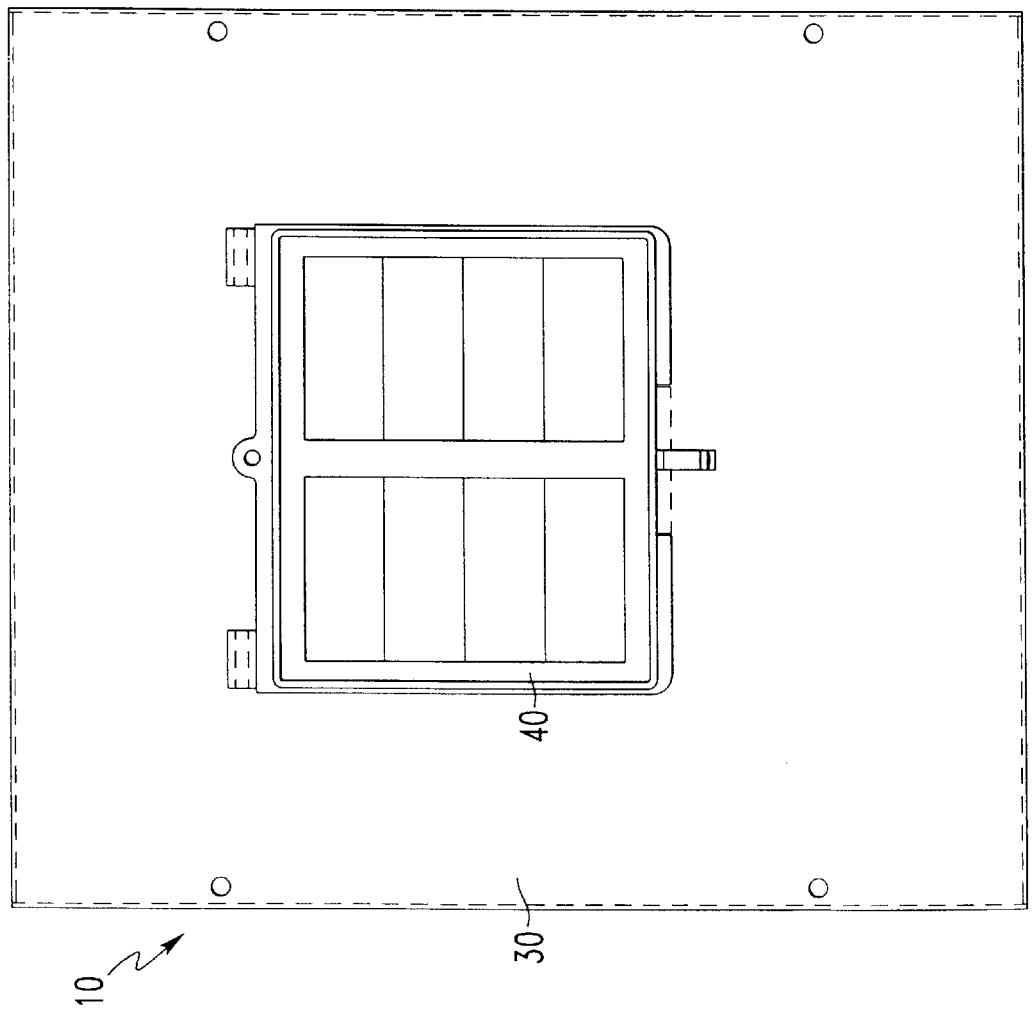
FIG. 1 is a front elevational view of an electrical distribution panel enclosure in accordance with an embodiment of the present invention.

Referring to the figures wherein like reference numbers represent like elements throughout the several drawings, FIG. 1 is a front view of an electrical distribution panel enclosure 10 having a front panel 30 with an insert 40 seated therein. As shown most clearly in FIG. 2, the enclosure 10 comprises a box 12 to which the front panel 30 is attached. Several knockouts 18 are located along the side walls of the box 12 to allow access for electrical wires. The enclosure shown in FIGS. 1 and 2 is particularly adapted for indoor use in accordance with NEMA 1 standards.

Figure 2:
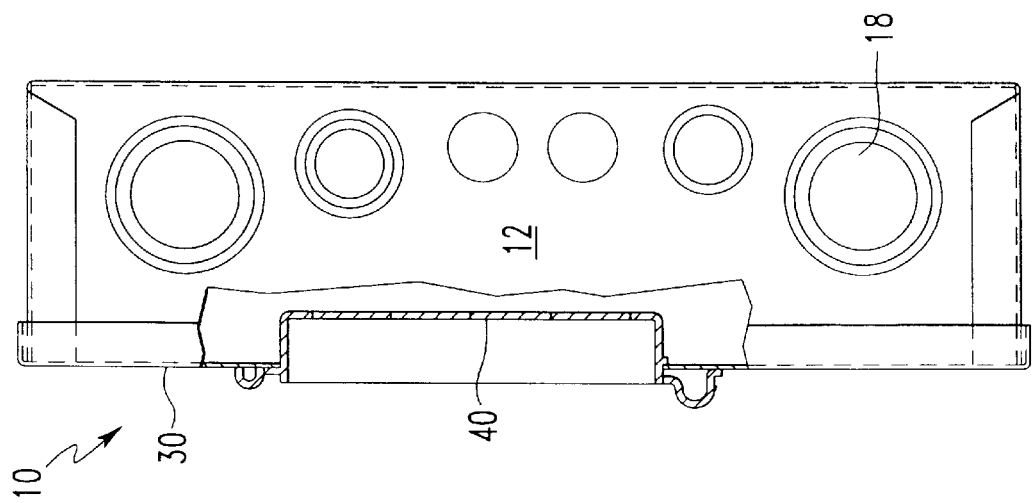
FIG. 2 is a partially cut-away side view of the distribution panel enclosure of FIG. 1.
Figure 4:
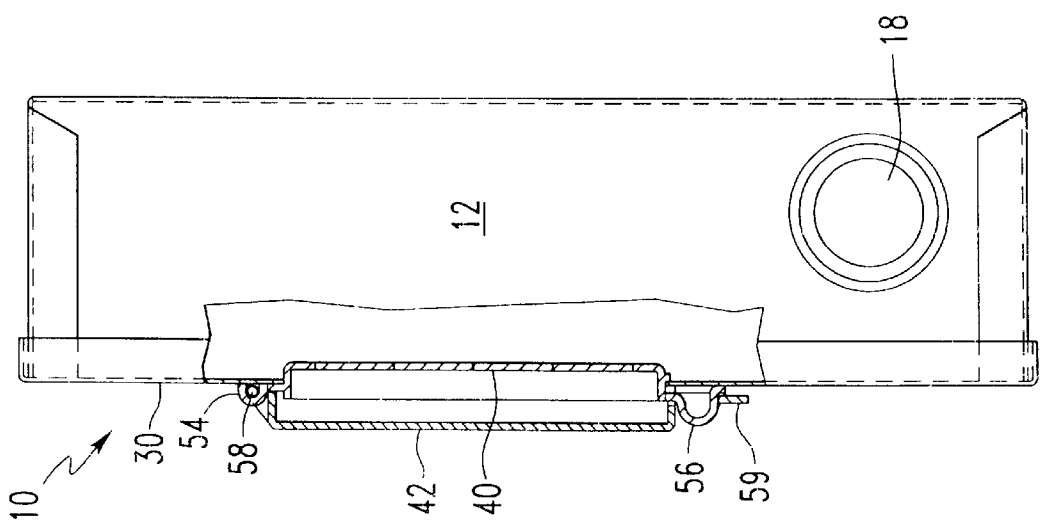
FIG. 4 is a partially cut-away side view of the distribution panel enclosure of FIG. 3.
Figure 3:
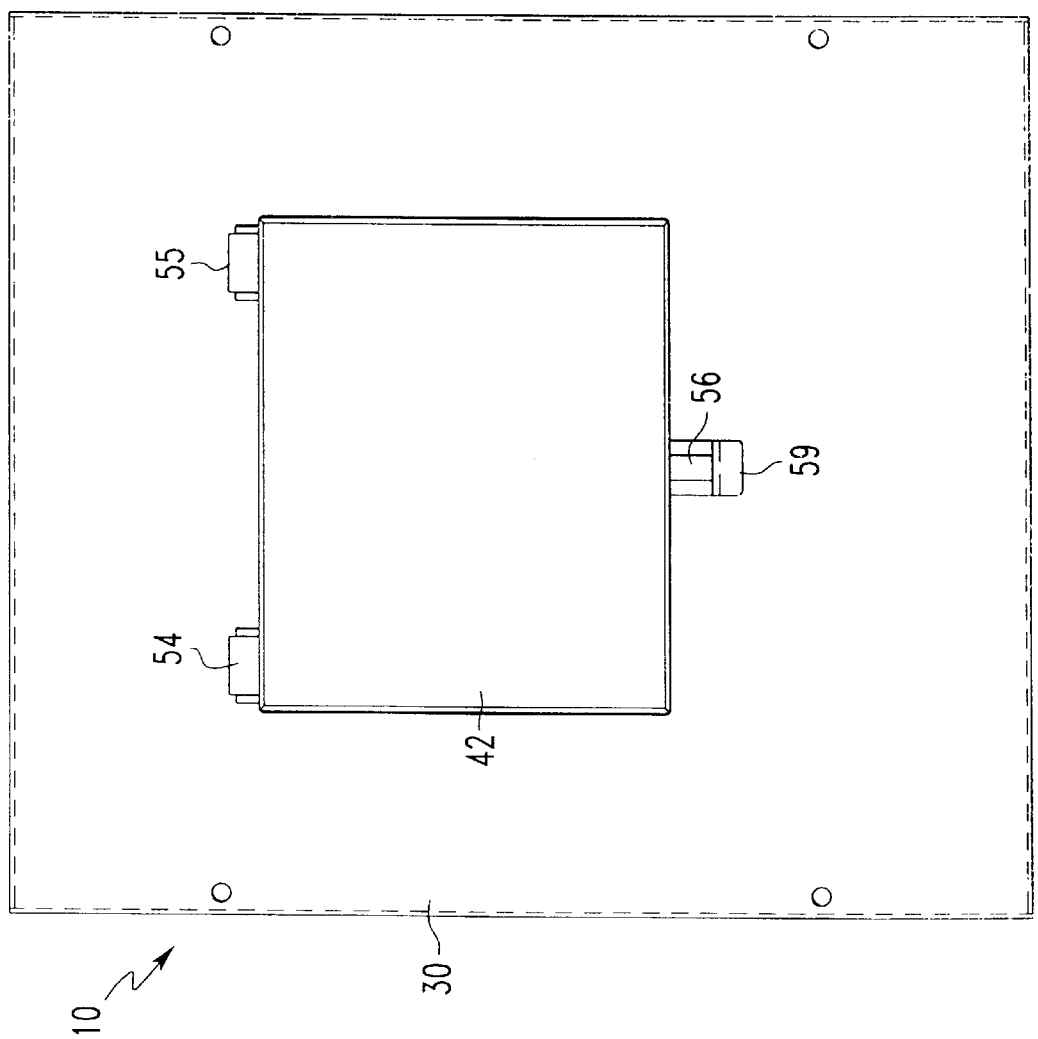
FIG. 3 is a front elevational view of an electrical distribution panel enclosure in accordance with another embodiment of the present invention.

FIGS. 3 and 4 illustrate an electrical distribution panel enclosure 10 similar to that shown in FIGS. 1 and 2, with the addition of a cover 42 attached to the insert 40 in the front panel 30. As shown most clearly in FIG. 4, the insert 40 comprises two generally semi-circular hinge housings 54 and 55. The cover 42 includes hinge pins rotatably received within the housings 54 and 55. The cover 42 may be secured in a closed position as shown in FIG. 4 by means of a fastener comprising a latch 56 extending from the insert 40 which is inserted through a slot in a keeper 59 which extends from the cover 42. As more fully described below, the insert 40 extends through the front panel 30 into the box 12 a predetermined distance depending on the type of circuit breaker to be used in the enclosure 10. The box 12 may optionally include a knockout 18 on each of its side walls. The enclosure 10 shown in FIGS. 3 and 4 is particularly suitable for outdoor use in accordance with NEMA 3R standards.

Figure 5:
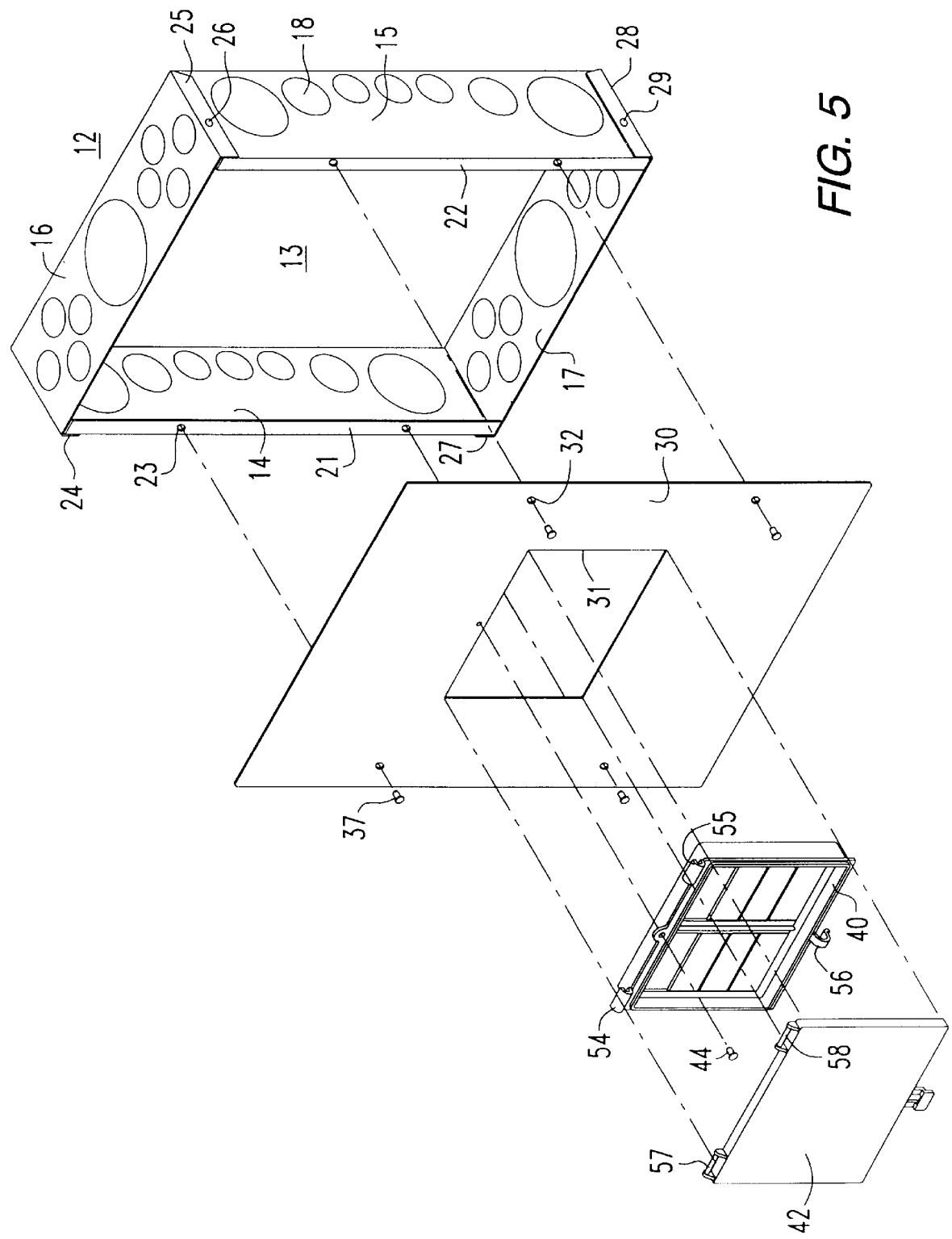
FIG. 5 is an exploded perspective view showing the component parts of an electrical distribution panel enclosure for indoor use in accordance with an embodiment of the present invention.

FIG. 5 is an exploded view showing the different components of an electrical distribution panel enclosure for indoor use in accordance with an embodiment of the present invention. The enclosure includes a box 12 having a rear panel 13 with side walls 14 and 15, a top wall 16 and a bottom wall 17 extending therefrom. Several knockouts 18 may optionally be located on the side, top and bottom walls. The side walls 14 and 15 include bent tab portions 21 and 22, respectively, which have holes 23 formed therein. Alternatively, bent tabs may be provided on the top 16 and bottom 17 walls. The top wall 16 includes overlapping tabs 24 and 25 which cover the upper portions of the side walls 14 and 15. The overlapping configuration of the top wall 16 advantageously limits water penetration into the interior of the enclosure. Holes 26 may be drilled through the overlapping tabs and the side walls to allow for insertion of fasteners (not shown). The bottom wall 17 may likewise include overlapping tabs 27 and 28 covering the bottom portions of the side walls 14 and 15.

The front panel 30 is secured to the box 12 by any suitable means such as mechanical fasteners 37 inserted through holes 32 in the cover 30 and seated in the holes 23 of the bent portions 21 and 22 of the box 12.

The insert 40 is seated within a cut-out portion 31 of the front panel 30. The insert 40 may be secured to the front panel 30 by any suitable means such as mechanical fasteners 44, press fittings, snap fittings, adhesives and the like. The cover 42 may be rotatably mounted on the insert 40 by placing the hinge pins 57 and 58 inside the hinge housings 54 and 55.

In accordance with the present invention, the box 12 may be formed from any suitable material, preferably folded sheet metal. Likewise, the front panel 30 may be formed from any suitable material such as sheet metal. The insert 40 is preferably made of molded plastic such as modified phenylene oxide (PPO), or any other suitable material. Similarly, the cover 42 may be made from molded PPO or other suitable materials.

Figure 6:
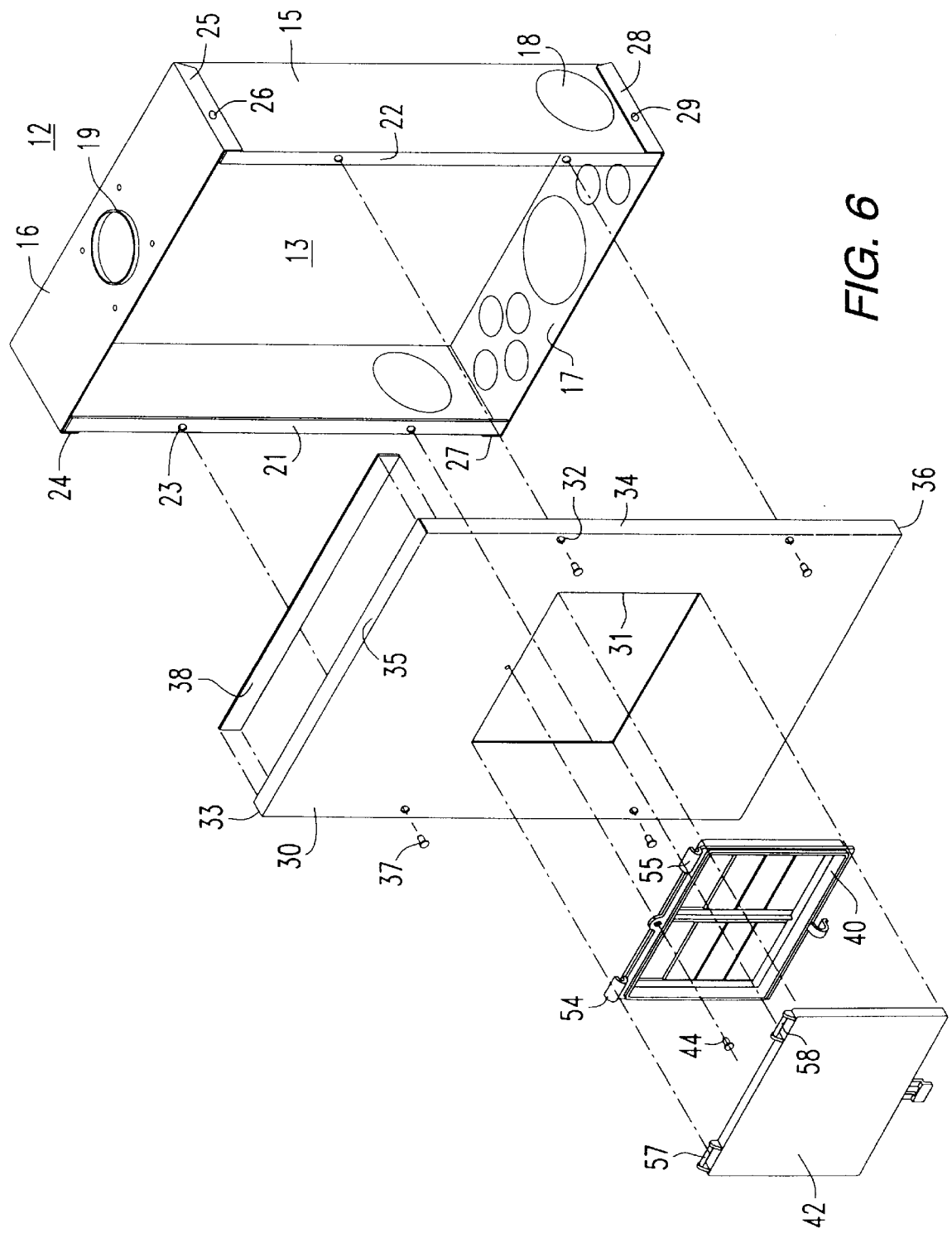
FIG. 6 is an exploded perspective view showing the component parts of an electrical distribution panel enclosure for outdoor use in accordance with another embodiment of the present invention.

FIG. 6 is an exploded view of an electrical distribution panel enclosure adapted for outdoor use in accordance with the present invention. As with the enclosure shown in FIG. 5, the enclosure of FIG. 6 includes a box 12 having a rear panel 13 with side walls 14 and 15, a top wall 16 and a bottom wall 17 extending therefrom. Knockouts 18 may optionally be provided on the lower portions of the side walls 14 and 15, and along the bottom wall 17. An extruded hole 19 extends through the top wall 16 to provide a conduit fitting in accordance with NEMA 3R standards.

The front panel 30 is secured to the box 12 by any suitable fastening means such as mechanical fasteners 37 extending through holes 32 in the front panel 30 and into holes 23 in the bent tab portions 21 and 22 of the box 12. In order to deter unauthorized entry, the front panel 30 may be locked to the box 12 by, for example, a tab (not shown) secured to the box 12 and extending through a cut-out portion of the front panel 30, with the tab including a hole for receiving a combination lock or the like. In order to reduce water penetration, a gasket 38 is sandwiched between the front panel 30 and the top wall 16 of the box 12. The gasket may be made of any suitable material such as neoprene or foam rubber.

The insert 40 shown in FIG. 6 is likewise seated in a cut-out portion 31 of the front panel 30. The cover 42 is also hinged to the insert 40. As more fully described below, the insert 40 is seated against the front panel 30 such that a substantially waterproof seal is obtained. In addition, the cover 42 is sealed in a waterproof manner to the insert 40 by means of a gasket arrangement, as described below.

In the present embodiment of the invention, cover 30 may include bent edge walls 33, 34, 35 and 36, which extend in a substantially perpendicular direction therefrom, wherein the edge walls overlap a portion of the top and side walls of the box 15.

Figure 7:
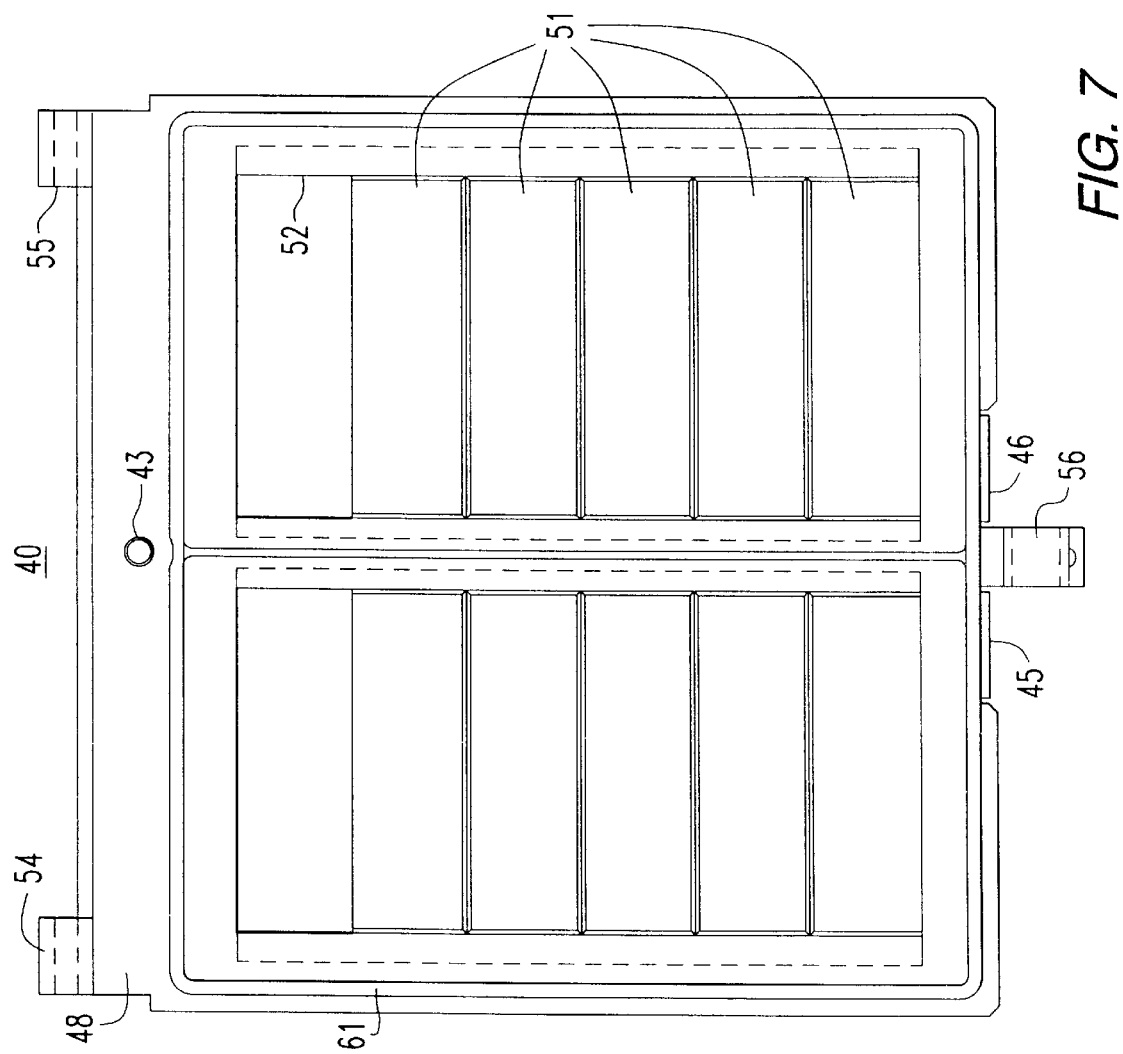
FIG. 7 is a front elevational view of an electrical distribution panel insert in accordance with an embodiment of the present invention.

FIG. 7 provides a detailed front elevational view of an insert 40 of the present invention. The insert 40 includes a hole 43 for receiving a mechanical fastener 44 which helps secure the insert to the front panel 30. The bottom portion of the insert 40 includes extensions 45 and 46 which are inserted through the cut-out portion 31 and contact the inside surface of the front panel 30. A rim 48 extends around the periphery of the insert 40. The rim 48 preferably lies flush with the front surface of the front panel 30 when the insert is seated in the cut-out portion 31. A raised gasket 61 extends around the periphery of the insert 40 and contacts the cover 42 in the closed position. The front face of the insert 40 includes several knockouts 51 which can be individually removed by pushing or twisting. In FIG. 7, one of the knockouts has been removed to provide an opening 52. The individual knockouts 51 can be selectively removed in order to gain access to circuit breakers mounted within the electrical distribution panel. While the knockouts 51 extend horizontally in FIG. 7, they can extend in other directions such as vertically.

Figure 8:
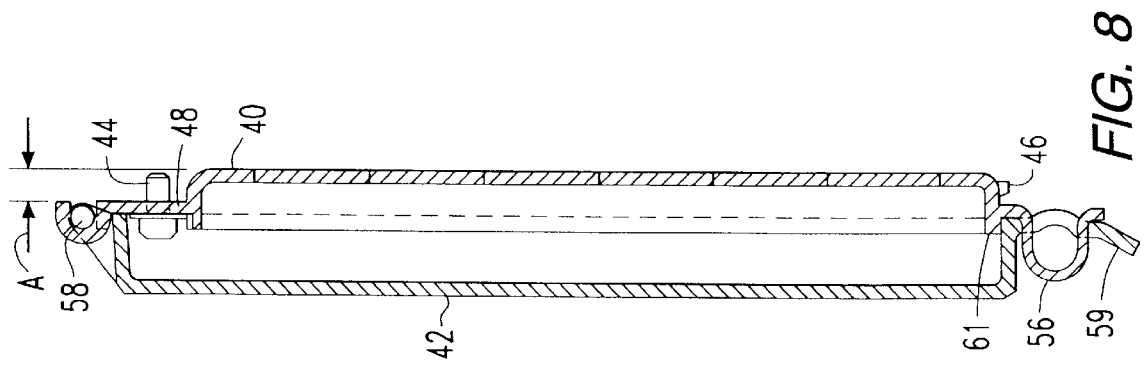
FIG. 8 is a side sectional view of an insert similar to that shown in FIG. 7 with a hinged cover attached thereto.

As shown most clearly in FIG. 8, the cover 42 may be secured against the insert 40 in a closed position which substantially prevents water penetration. This is achieved by contact between the horizontally extending edges of the cover 42 and the vertically extending rim 48 of the insert 40. Additional sealing is provided through contact between the cover 42 and the raised gasket 61.

The cover 42 may be fastened to the insert 40 by a tamper evident latch 56, 59. A wire or lock (not shown) may be inserted through the latch opening 56 in order to deter unwanted opening of the cover 42, and to indicate whether unauthorized entry has occurred.

Figure 9:
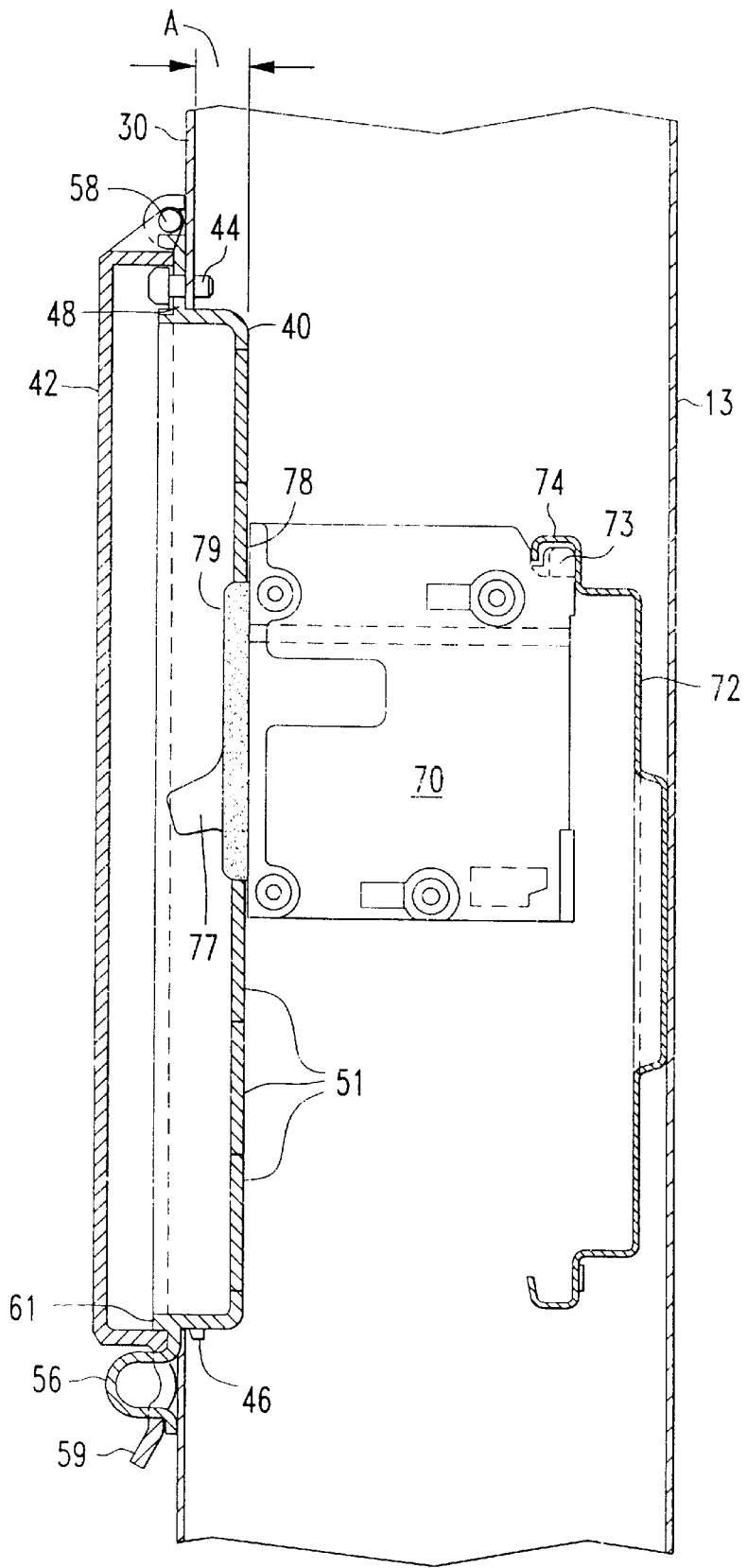
FIG. 9 is a side sectional view of a portion of an electrical distribution panel enclosure including a circuit breaker having a switch that extends through an insert of the enclosure in accordance with the present invention.
Figure 10:
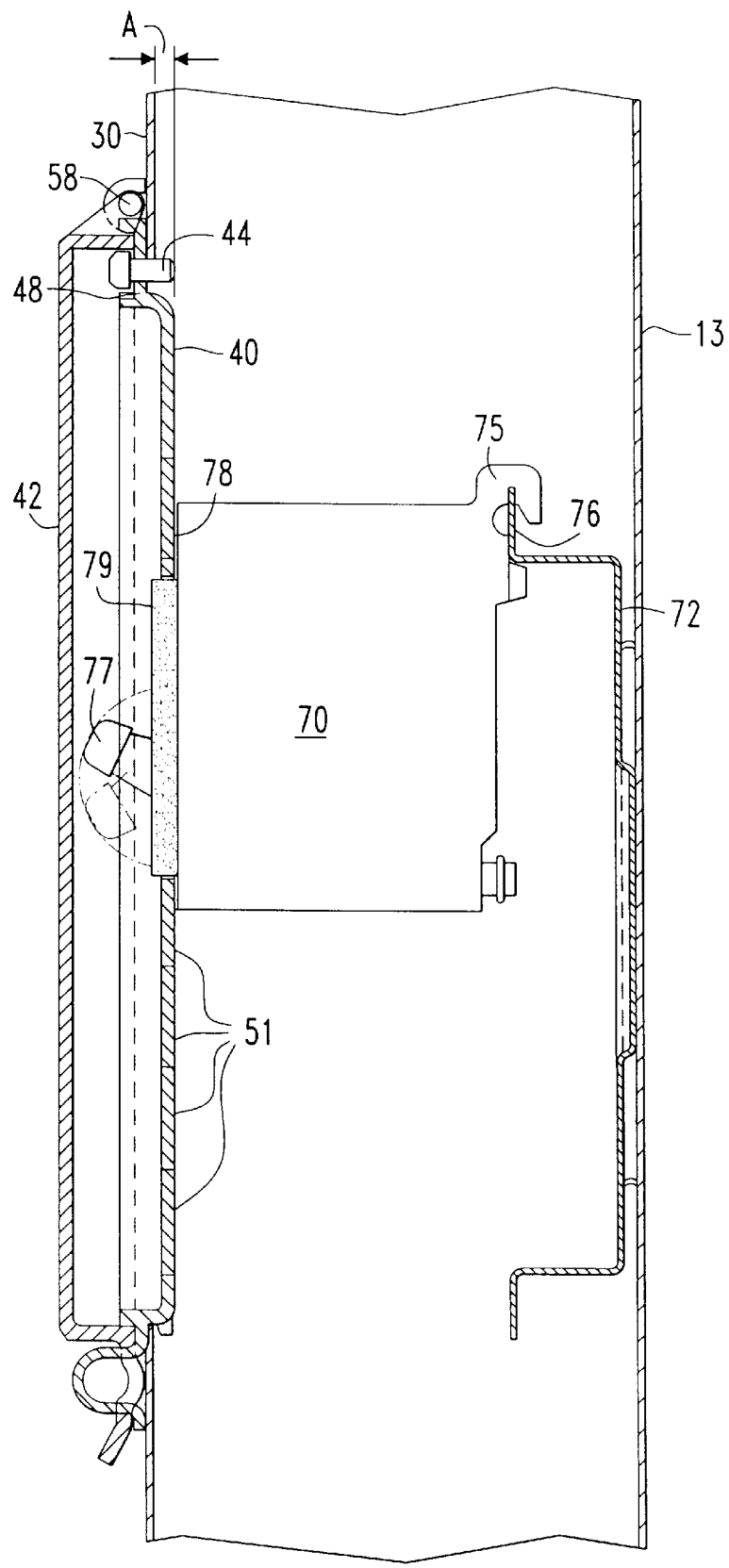
FIG. 10 is a side sectional view of a portion of an electrical distribution panel enclosure including another type of circuit breaker having a switch that extends through an insert of the enclosure in accordance with an embodiment of the present invention.

FIGS. 9 and 10 illustrate electrical distribution panel enclosures containing different types of circuit breakers. In FIG. 9, the enclosure houses a conventional circuit breaker 70 having a 1 inch wide breaker pole. The circuit breaker 70 is mounted on the rear panel 13 of the enclosure by means of a support bracket 72. A heel 73 extends from the circuit breaker 70 underneath a clip 74 of the support bracket 72. A handle 77 is rotatably mounted on the circuit breaker 70. The circuit breaker includes a front surface 78 having an extension 79 in which the handle 77 is mounted.

The insert 40 is mounted in the front panel 30 by means of a fastener 44 located near the top of the insert and extensions 45 and 46 located near the bottom of the insert. The rim 48 of the insert 40 is thus mounted flush against the outer face of the front panel 30. As discussed previously, contact between the rim 48 and the front panel 30, as well as contact between the cover 42 and the rim 48 and the raised gasket 61 of the insert 40, provide a substantially waterproof seal which reduces or eliminates water penetration into the interior of the enclosure.

The insert 40 extends from the front panel 30 toward the rear panel 13 of the enclosure a predetermined distance A based on the geometry of the circuit breaker 70. The distance A is selected such that the insert 40 contacts or comes in close proximity to the front surface 78 of the circuit breaker 70. Selected knockouts 51 may be removed from the insert 40 to permit the extended portion 79 of the circuit breaker 70 to pass therethrough, and to allow access to the circuit breaker handle 77.

In FIG. 10, the electrical distribution panel enclosure houses a different type of conventional circuit breaker 70 having a ¾ inch wide breaker pole. This type of circuit breaker has a hook 75 which engages an extension 76 of the support bracket 72. In this configuration, the circuit breaker 70 may extend further toward the front panel 30 of the enclosure in comparison with the circuit breaker illustrated in FIG. 9. The circuit breaker 70 of FIG. 10 likewise includes a front surface 78 having an extended portion 79. A circuit breaker handle 77 is rotatably mounted on the extended portion 79. In this embodiment, the distance A which the insert 40 extends through the front panel 30 is selected to accommodate the distance the front surface 78 extends from the rear panel 13. Selected knockouts 51 are removed in order to provide an opening for the extended portion 79. By comparing FIGS. 9 and 10, it can be seen that the only component which must be changed in order to accommodate the different type of circuit breaker 70 is the insert 40. The other components, including the box 12, the front panel 30 and the cover 42 may be the same for both types of circuit breakers.

Thus, instead of providing a different front panel 30 and/or a different box 12 for each different kind of circuit breaker 70, the present invention allows the same type of enclosure components to be used for different types of circuit breakers. By selecting the appropriate distance A that the insert 40 extends into the enclosure, different types of circuit breakers can be accommodated.

Figure 11:
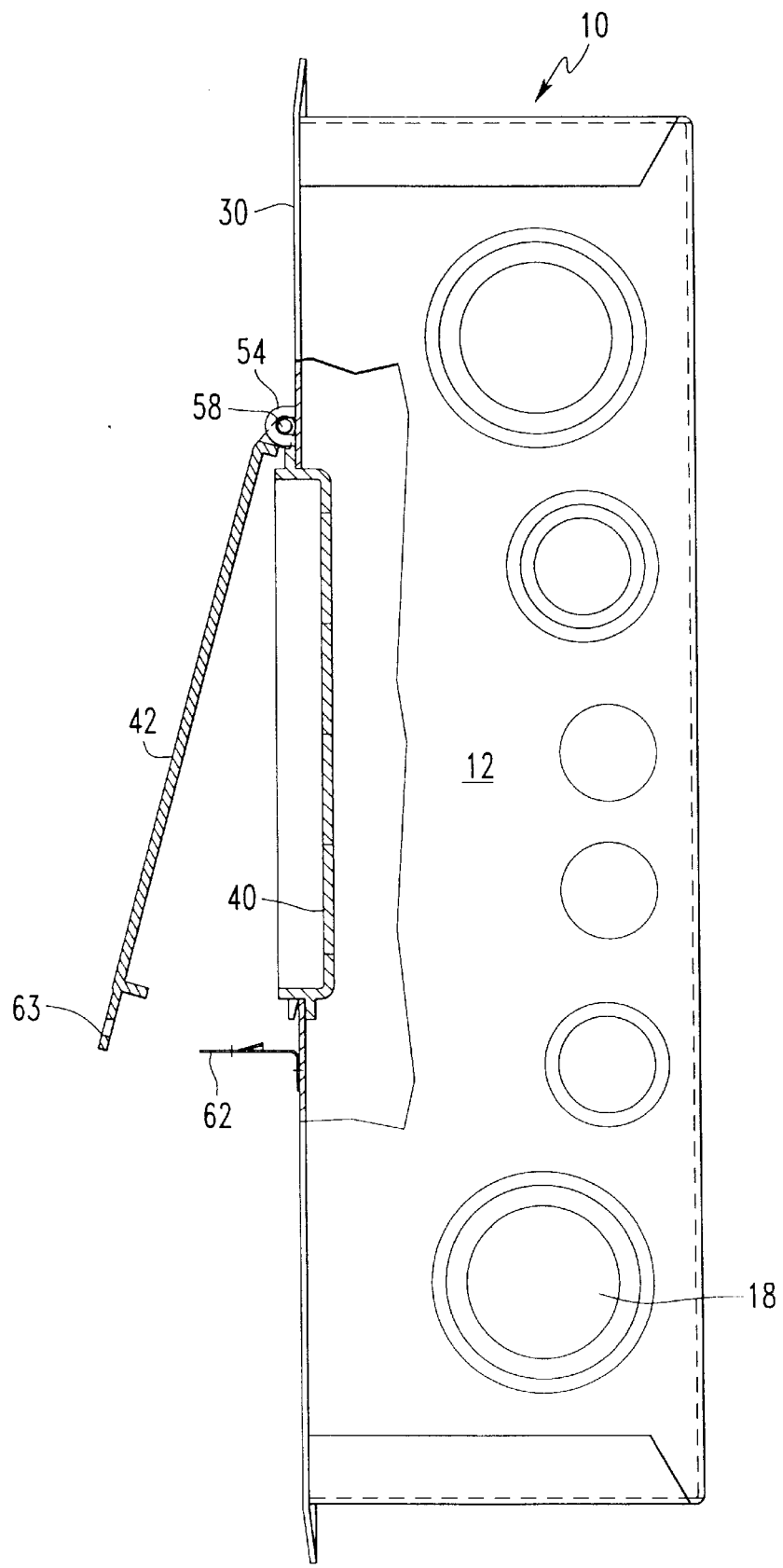
FIG. 11 is a partially cut-away side view of an electrical distribution panel enclosure in accordance with another embodiment of the present invention.

FIG. 11 is a side view of an electrical distribution panel enclosure for indoor use in accordance with an alternative embodiment of the present invention. The enclosure is similar to that shown in FIG. 2, but with a different front panel and cover latch. The front panel 30 has slightly angled edges which provide a bevelled appearance. Instead of a latch which is integrally formed with the insert 40, the enclosure of FIG. 1 includes a latch 62 which is attached to the front panel 30 by any suitable means such as mechanical fasteners. The latch 62 is received within a keeper slot 63 in the cover 42. The latch 62 may include a hole for receiving a sealed wire or lock in order to deter and/or indicate the occurrence of unauthorized entry.

FIG. 12 is an exploded view of an electrical distribution panel enclosure adapted for outdoor use in accordance with the present invention. The enclosure shown in FIG. 12 is similar to that shown in FIG. 6. However, the cover 42 is hinged at the side rather than at the top. In order to reduce water penetration, the front panel 30 shown in FIG. 12 includes a recessed upper portion 85 which is received in indented portions 83 and 84 in the side walls 14 and 15 of the box 12. When the enclosure is assembled, the recessed portion 85 fits underneath the top wall 16 and is covered by an overlapping lip 81 extending from the top wall 16. This overlapping construction shown in FIG. 12 reduces or eliminates water penetration without the necessity of a gasket 38 shown in the embodiment of FIG. 6.

The front panel 30 shown in FIG. 12 is secured at the top to the overlapping lip 81 and at the bottom to a bent tab 82 which extends from the bottom wall 17 by means of fasteners 37. In addition to the fasteners 37, unauthorized entry may be deterred by locking the front panel 30 to the box 12. For example, a tab (not shown) may be secured to the box 12 and may extend through a cut-out portion of the front panel 30, with the tab including a hole for receiving a lock or the like. The embodiment shown in FIG. 12 replaces the overlapping tabs 27 and 28 shown in FIG. 6 with internal tabs located inside the side walls 14 and 15. One such internal tab 87 is shown in FIG. 12. Such internal tabs provide additional protection against water penetration.

The enclosure shown in FIG. 5 adapted for indoor use may be modified as shown in FIG. 12. For example, the cover 42 shown in FIG. 5 may be hinged at the side rather than at the top. In addition, the box 12 shown in FIG. 5 may be provided with upper and lower bent tabs similar to the lip 81 and tab 82 shown in FIG. 12. Furthermore, the tabs 27 and 28 shown in FIG. 5 may be located inside the side walls 14 and 15 as shown in FIG. 12.

While certain embodiments of the present invention have been described herein, it is to be understood that various modifications, changes, additions and adaptations are within the scope of the invention, as set forth in the following claims.

What is claimed is:

1. An enclosure for an electrical distribution panel comprising:

a box including a rear panel having side, top and bottom walls extending therefrom defining a front opening;

a front panel covering the front opening and including a cut-out portion; and an insert extending through the cut-out portion of the front panel toward the rear panel of the box and including means for allowing access to at least one handle of at least one circuit breaker in the enclosure.

2. The enclosure of claim 1, wherein the box comprises two substantially vertical side walls having upper edge portions and a substantially horizontal top wall overlapping the upper edge portions of the side walls.

3. The enclosure of claim 2, wherein the front panel comprises a substantially vertical front face with bent edge walls extending in a substantially perpendicular direction therefrom, the edge walls overlapping a portion of at least the top and side walls of the box.

4. The enclosure of claim 3, further comprising a gasket sealing the front panel against the substantially horizontal top wall of the box.

5. The enclosure of claim 2, wherein the front panel comprises a substantially vertical front face with a recessed upper portion and the substantially horizontal top wall comprises an overlapping lip covering at least a portion of the recessed upper portion of the front panel.

6. The enclosure of claim 1, wherein the insert is made of molded plastic.

7. The enclosure of claim 1, wherein the means for allowing access comprises at least one removable knockout panel in the insert.

8. The enclosure of claim 1, wherein the distance that the insert extends through the cut-out portion of the front panel toward the rear panel of the box is selected based on the dimensions of a circuit breaker to be installed in the enclosure.

9. The enclosure of claim 1, further comprising a cover for the insert.

10. The enclosure of claim 9, wherein the cover is substantially coextensive with the insert.

11. The enclosure of claim 9, wherein the cover is made of molded plastic.

12. The enclosure of claim 9, wherein the cover is pivotally mounted on the insert.

13. The enclosure of claim 9, further comprising seal means for providing a substantially waterproof seal between the insert and the cover when the cover is in a closed position.

14. The enclosure of claim 13, wherein the seal means comprises a raised gasket extending from the insert which contacts the cover when the cover is in the closed position.

15. The enclosure of claim 9, wherein the cover is fastened to the insert by a tamper evident latch.

16. An insert for an electrical distribution panel enclosure having a front panel with a cut-out portion, the insert comprising:

rim means for seating the insert adjacent the front panel of the enclosure;

extension means extending from the rim means for insertion through the cut-out portion of the front panel;

access means in the extension for allowing access to an least one handle of at least one circuit breaker mounted in the enclosure;

a cover pivotally mounted on the insert.

17. The insert of claim 16, wherein the cover is substantially coextensive with the insert.

18. The insert of claim 16, wherein the cover is made of molded plastic.

19. The insert of claim 16, further comprising seal means for providing a substantially waterproof seal between the insert and the cover when the cover is in a closed position.

20. The insert of claim 19, wherein the seal means comprises a raised gasket extending from the rim means which contacts the cover when the cover is in a closed position.

21. The insert of claim 16, wherein the cover is fastened to the insert by a tamper evident latch.

22. An electrical distribution panel comprising:

an enclosure including a rear panel having side, top and bottom walls extending therefrom defining a front opening, a front panel covering the front opening, and an insert extending through a cut-out portion of the front panel toward the rear panel and having an access opening; and at least one circuit breaker in the enclosure fastened to the rear panel, wherein the circuit breaker has at least one handle extending through the access opening in the insert.

23. A method of making an enclosure for an electrical distribution panel comprising:

forming a box including a rear panel having side, top and bottom walls extending therefrom defining a front opening;

providing a front panel having a cut-out portion;

inserting an insert through the cut-out portion of the front panel, the insert including at least one removable knockout panel; and fastening the front panel over the front opening of the box.

24. The method of claim 23, wherein forming of the box comprises the steps of:

bending a sheet of metal to form two substantially parallel side walls extending substantially perpendicularly from the rear panel; and bending the sheet of metal to form a top wall extending substantially perpendicularly from the rear panel and overlapping at least a portion of the two side walls.

25. The method of claim 23, further comprising providing a cover for the insert which provides a substantially waterproof seal between the insert and the cover.

* * * * *